Patented Feb. 24, 1953

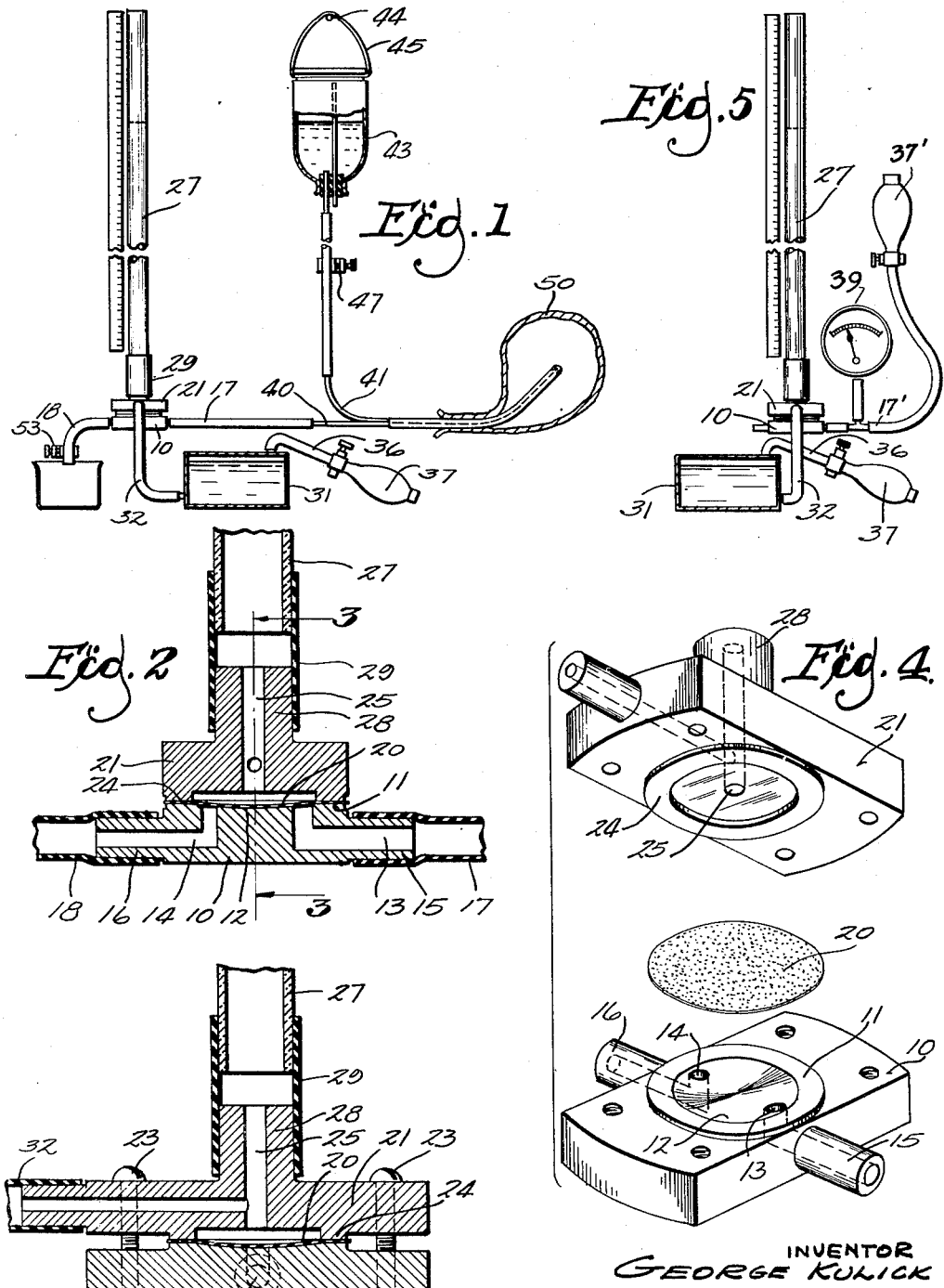

2,629,399

UNITED STATES PATENT OFFICE 2,629,399

SAFETY VALVE FOR REGULATING AND TESTING LIGHT PRESSURES

George Kulick, Milwaukee, Wis.

Application October 16, 1946, Serial No. 703,580

4 Claims. (Cl. 137—525)

My invention relates to improvements in safety valves for regulating and testing light pressures.

My primary object is to provide a safety valve adapted for use in association with a catheter, for testing pressures and for regulating flushing pressures, or the pressures of liquid medicaments introduced, for example, into the bladder of a patient.

Further objects are to provide accurate means for testing pressure gages, such as Bourdon gages, or for accurately calibrating such pressure gages; to provide a valve which will accurately regulate the discharge of a fluid at a desired pressure and rate of continuous flow without pulsation or irregular delivery; to provide a diaphragm valve which may be opened by the liquid to be delivered under a pressure predetermined by a column of another liquid in contact with the opposite side of the diaphragm, the height of which column may be manually varied to suit the requirements of any given occasion; and, in general, to provide accurate hydraulic means for controlling the operation of an extremely sensitive pressure regulating valve, operative under pressures too light to be accurately controlled by ordinary means.

In the drawings:

Figure 1 is a diagrammatical view in side elevation of an embodiment of my invention, adapted for use by a physician for testing and regulating pressure in the bladder of a patient, introducing medicament, and for flushing purposes.

Figure 2 is a sectional view of the diaphragm chamber, drawn to a vertical plane intersecting the axes of the inlet and outlet ducts.

Figure 3 is a sectional view of the same, drawn to line 3—3 of Figure 2.

Figure 4 is a perspective view of the parts of said diaphragm chamber in separated relation.

Figure 5 is an elevation of a device embodying my invention as used for testing or calibrating a pressure gage.

Like parts are identified by the same reference characters throughout the several views.

As illustrated in Figures 1 to 4, inclusive, a diaphragm chamber is formed with a base portion 10 having a circular marginal upper surface portion 11 encircling a concave central portion 12, provided with an inlet port 13 at one side of its center, and an outlet port 14 at the other side of its center leading through tubular studs 15 and 16, respectively, to which lengths of hose 17 and 18 may be connected. A flexible diaphragm 20, preferably of rubber, is marginally clamped to the surface 11 by an upper member 21 of the diaphragm chamber. Member 21 is secured to the base portion 10 by bolts or screws 23, as shown in Figure 3, and its lower surface is recessed at 24 above the central portion of the diaphragm which covers the concave portion 12 of the base.

Passage 25 leads upwardly from the recess 24 through the member 21 and communicates with a stand pipe 27 to which a suitable scale is attached to indicate either the height of the column of liquid in the pipe or the pressures of the liquid on the diaphragm. The pipe 27 is preferably formed of glass and has its lower end connected to a tubular stud 28 on member 21 by a jacket 29 of sufficient rigidity to hold the pipe 27 in an upright position.

The height of the liquid in the pipe 27 may be manually regulated by employing a closed supply chamber 31 having its lower portion connected to the passage 25 by a pipe 32. Air pressure may be supplied to the liquid in chamber 31 by a pump having a valved passage 36 of any ordinary construction. For light pressures a rubber bulb 37 may be used as a pump.

In Figure 1, my safety valve mechanism is illustrated in association with a set of duplex catheter tubes 40 and 41. The tube 41 is connected to a reservoir 43 suspended from a support at 44 by a suitable bail 45, whereby it is held with its liquid content at the same height as the liquid in tube 27. A pinch valve at 47 is manually operable to shut off the supply of liquid which would otherwise be delivered through the tube 41. The bladder of the patient is diagrammatically illustrated at 50. When the pinch valve at 47 is released, the pressure of the liquid in the bladder of the patient will be determined by the height of the column of liquid in pipe 27, and it cannot exceed that predetermined pressure because the slightest excess will cause the diaphragm to raise and release a portion of the liquid through the outlet port 14. The novel manner of coaction between the flexible diaphragm and the fluid pressure is of particular interest and of fundamental importance in the invention. It is a well known hydraulic principle of physics that the total fluid force exerted against a surface is the per unit fluid pressure multiplied by the area against which said pressure is exerted. If the elevational levels of the liquids in column 27 and reservoir 43 are such that the per unit pressure on either side of the diaphragm is substantially the same, slight variations in the elevation of reservoir 43 would have no effect whatsoever upon the diaphragm 20 if it possessed any degree of stiffness. This conclusion flows naturally from the aforesaid physical principle since the downward force cumulation over the entire upper surface of diaphragm 20 is obviously many times greater than the force exerted upwardly on the relatively small diaphragm area defined by the inlet port 13.

The reservoir 43 would have to be lifted to an elevation greatly in excess of that of the fluid in column 27 in order to develop an overbalancing upward pressure on the diaphragm.

Furthermore, if the diaphragm 20 possess any degree of stiffness, once the pressure at the inlet port had built up to the point where it overcomes the cumulative downward pressure of the fluid in column 27 so as to lift the diaphragm, the fluid from reservoir 43 will flow over the entire undersurface of the diaphragm thus rapidly building up in diaphragm contact area so as to then result in a situation where the cumulative upward pressure greatly exceeds the cumulative downward pressure. The diaphragm consequently would be held open until the reservoir 43 was lowered to a position reducing the unit pressure at the inlet port below that of the fluid in column 27. Such an arrangement would be so insensitive to slight adjustment of the elevation of the reservoir as to be completely unsatisfactory for the purposes contemplated.

By the employment of a flexible diaphragm, slight increases of localized pressure at the inlet port areas of the undersurface of the diaphragm will locally mold the diaphragm upwardly immediately above the inlet port and such upward molding will tend to peel the diaphragm slightly from the seating surface areas adjacent the port. The relatively higher port side unit pressure will then force small quantities of the liquid beneath the under surfaces of the diaphragm in such port adjacent areas so as to rapidly develop an upward pressure on the diaphragm roughly concentrically of the port and quickly encompass the entire undersurface of the diaphragm. Thus the diaphragm will be lifted when the slightest differential pressure is manifested between the liquid in the reservoir 43 and column 27 respectively and the valve will respond immediately to the slightest pressure differential.

It is readily seen that the flexible diaphragm, in combination with the fluid pressure exerted downwardly on said diaphragm against the inlet port, results in a highly sensitive valve mechanism eminently suitable as a safety valve for medical use and as an instrument of accurate calibration. Even a slight cough by the patient will increase the pressure in the bladder sufficiently to lift the diaphragm and permit a slight escape of liquid through the diaphragm chamber underneath the diaphragm. Also, during a flushing operation the reservoir 43 may be lifted slightly and its liquid delivered through the bladder and the lower portion of the diaphragm chamber to the outlet 14. By having a valve 53 in the outlet 14, or in the discharge pipe 18, the passage of the liquid through the outlet may be sufficiently impeded to prevent any pulsating or vibratory movement of the diaphragm, or, if desired, the outlet port 14 may be made of slightly less diameter than the inlet port 13 in order to establish a slight differential pressure to prevent pulsating or vibratory movements of the diaphragm during the discharge of liquid through the valve chamber.

The safety of the patient is assured, since it is not possible to increase the pressure in the bladder of the patient above that required to lift the diaphragm and permit the escape of liquid through the lower cavity of the diaphragm chamber. The upper cavity or recess above the diaphragm has no communication with the lower cavity, and therefore the liquid column in pipe 27 may be kept at a constant height and relied upon to accurately predetermine the inlet pressure required to lift the diaphragm. While the pipe 27 may contain water, a heavier liquid will ordinarily be used, in order that a short pipe may be available.

In the Fig. 5 construction, a pressure gauge 39 requiring calibration has been connected into the tube 17' leading to the inlet of valve 10 from the bulb type pump 37'. It will obviously be impossible to develop more pressure in the tube 17' than the pressure for which the height of the column of liquid in the pipe 27 is adjusted, as shown by the calibration thereof. Consequently, when repeated operation of the pump 17' will not raise the gauge 39 any higher, the reading of the gauge 39 should correspond exactly with the pressure shown by reading against the calibrations of the transparent tube 27 the height of the column of liquid therein.

By using the pump 37 to vary the height of the column of liquid in pipe 27, and repeating the development of fluid pressure on gauge 39 to the maximum possible pressure under the new conditions, a further calibration of the gauge can be made. The operation can be repeated until all of the calibrations of the gauge have been checked.

I claim:

1. In a sensitive valve structure the combination with a casing comprising clamping parts, of a diaphragm having margins clamped between said parts, one of said casing parts having inlet and outlet ports and a seat surface about at least the inlet port and upon which one face of said diaphragm normally rests directly, the portion of the diaphragm resting on said seat being highly flexible, the other casing part having a cavity to which the other face of the diaphragm is exposed, and means for subjecting said other face to hydrostatic pressure in opposition to diaphragm displacement from its seat about the inlet port, said diaphragm being locally displaceable from said seat, said hydrostatic pressure means including a liquid reservoir having means affording communication with said cavity.

2. The device of claim 1 in which the seat surface and said one diaphragm face resting thereon are both concave, both the inlet and outlet parts being within the said concave seat surface.

3. The device of claim 1 in further combination with means for varying the hydrostatic pressure by raising the level of liquid in said reservoir respecting the level of said diaphragm.

4. The device of claim 3 in further combination with a flushing tube for a bodily orifice and having means communicating with said inlet port, said tube being subject to variable pressure, and said diaphragm being sensitively adapted to release through said inlet port all flushing tube pressure in excess of that to which hydrostatic pressure subjects said diaphragm.

GEORGE KULICK.

REFERENCES CITED

The following references are of record in the file of this patent:

UNITED STATES PATENTS

| Number | Name | Date |
|---|---|---|
| 102,464 | Campfield | Apr. 26, 1870 |
| 163,618 | Walker | May 25, 1875 |
| 197,072 | Ashton | Nov. 13, 1877 |
| 272,281 | Luther | Feb. 13, 1883 |
| 351,045 | Gilfillan | Oct. 19, 1886 |
| 1,258,426 | Mackintosh | Mar. 5, 1918 |
| 1,650,736 | Zelov | Nov. 29, 1927 |
| 1,737,588 | Hopkins | Dec. 3, 1929 |
| 1,744,087 | Watts | Jan. 21, 1930 |
| 1,916,635 | Pepper | July 4, 1933 |
| 2,089,851 | McIntosh | Aug. 10, 1937 |
| 2,248,363 | Kuenhold | July 8, 1941 |
| 2,277,656 | Falls | Mar. 25, 1942 |

FOREIGN PATENTS

| Number | Country | Date |
|---|---|---|
| 353,018 | Germany | of 1922 |